United States Patent Office 2,812,154
Patented Nov. 5, 1957

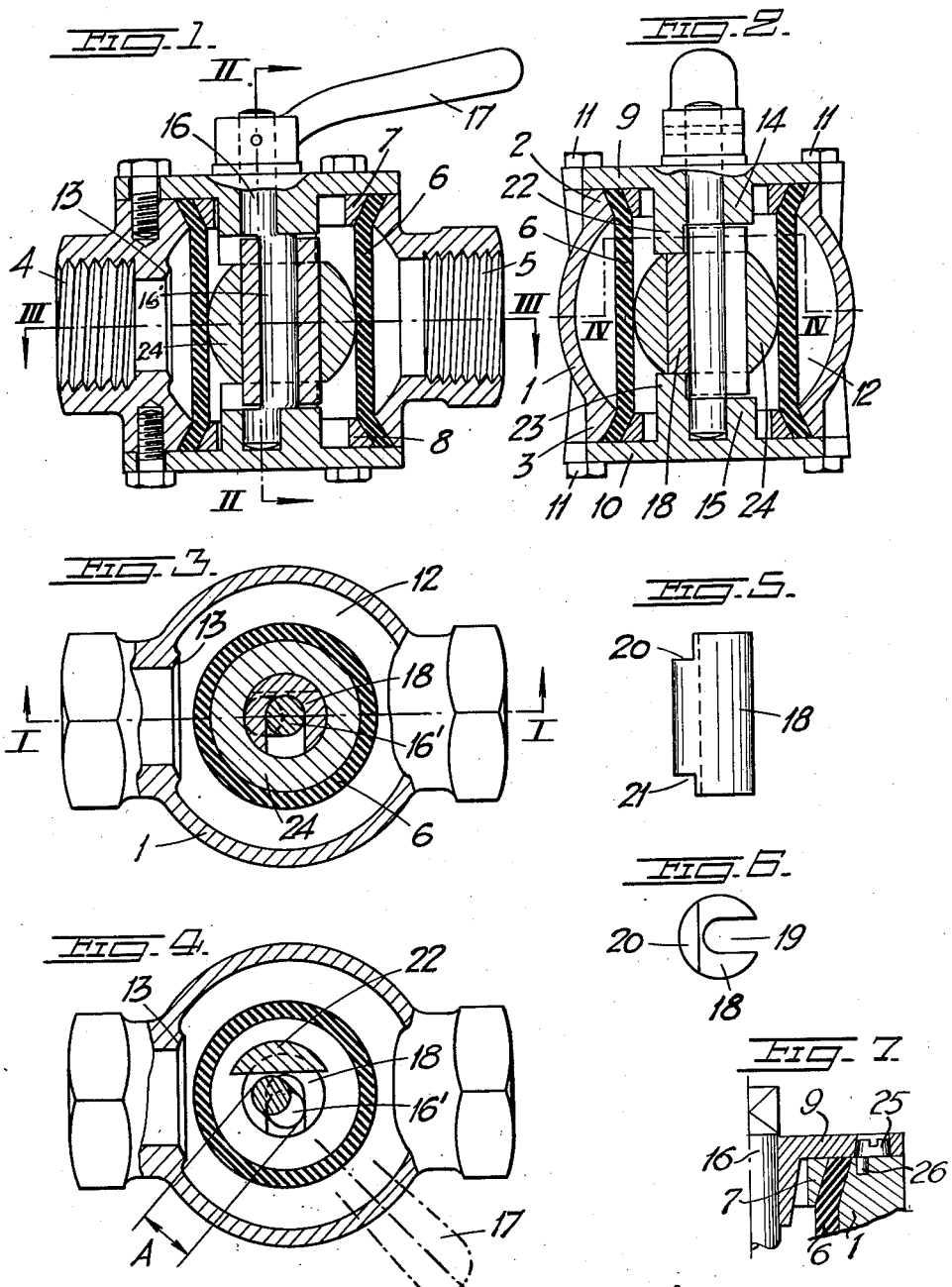

2,812,154
VALVE

Sven Gösta Nordstrand, Stockholm, Sweden

Application January 22, 1953, Serial No. 332,659

2 Claims. (Cl. 251—251)

The present invention relates to an improved valve to be used in connection with any gases or liquids especially compressed air, chemical media and food products.

Known valves for this purposes are usually provided with a member engaging a seat, said member being connected to a spindle and operated by means of a handle or a wheel. Such a spindle requires sealing means where it passes through the wall of the valve casing for preventing leakage of the gas or liquid through the space which unavoidably appears around the spindle.

The packing boxes or other sealing means generally used for this purpose are subjected to continuous wear and, therefore, require continuous attention and frequent repair in order to keep them in good condition. Especially at gas pipes under pressure small leakage causes considerable loss and furthermore there is a risk of injury in case of corrosive, noxious or explosive gas.

Therefore, there has been designed improved valves requiring no such packing boxes, but in which the valve operating means is permanently separated from the passage through the valve as, for instance, by a resilient diaphragm forming a window in one wall of said valve casing. Upon closing the valve said resilient diaphragm is urged towards and against a ridge on the wall opposite said diaphragm.

However, these valves have some drawbacks. If the fluid through the valve has a relatively high pressure said diaphragm is subjected to an outwardly directed force, which must be overcome when closing the valve. As a result thereof there must be a relatively great force applied to the diaphragm by the valve operating means and even at moderate pressures it is necessary to use a screw threaded spindle, and a complete closing of the valve generally requires several turns of the spindle. Furthermore, the diaphragm cannot be rigily supported over the whole area by the use of simple means and, therefore, portions of the diaphragm not supported tend to be bent out and to break.

In order to uniformly support the whole diaphragm a closed space may be provided adjacent said diaphragm on the side opposite the fluid controlled by the valve, said space being filled with a suitable fluid such as, oil, water or the like, having substantially the same pressure as the fluid within the passage through the valve. In order to maintain a constant pressure in said space independently of the position of said diaphragm there must be provided a compressed fluid type accumulator or the like in connection with said space. Moreover the operating member passing through the wall of said adjacent space must be sealed off by means of packing box to assure the pressure to be maintained within said space and thus, there is no advantage present with respect to usual shut off valves.

A main object of the present invention is to provide a new and useful valve requiring no packing box and which may be readily operated independently of the pressure in the valve.

Another object of this invention is to provide valve operating means which must be moved only half a turn of the handle to close or open the valve thereby permitting the same to be easily operated as by aid of any automatic means or by hand.

Still another object of this invention is to provide a valve which may be manufactured without substantially no machining.

Another object of this invention is to provide a valve which may readily be inspected without disconnecting the valve from the pipe system and which may be cleaned as by means of diluted nitric acid or the like in accordance with the requirements in food production industries.

Other objects and advantages of this invention will become apparent as the description of the same proceeds and the invention will be best understood from a consideration of the following detailed description taken in connection with the accompanying drawings forming a part of the application, with the understanding, however, that the invention is not to be limited to the exact details of construction shown and described since obvious modifications will occur to a person skilled in the art.

In the drawings:

Fig. 1 is a side elevational view of a valve according to the invention substantially in section along the line I—I of Fig. 3;

Fig. 2 is an end elevational view at a right angle to that shown in Fig. 1 substantially in section along the line II—II of Fig. 1;

Fig. 3 is a plan view substantially in section along the line III—III of Fig. 1.

Fig. 4 is a plan view substantially in section along broken line IV—IV of Fig. 2 showing the operating means in a different position from that shown in Figs. 1 to 3 inclusive;

Fig. 5 is a side elevational view of a structural detail,

Fig. 6 is an end view of the detail shown in Fig. 5;

Fig. 7 is a fragmentary sectional view showing an adjusting element;

Referring more particularly to Figs. 1 to 6 inclusive of the drawings a valve casing 1 having reduced end portions 2 and 3 provided with opposite inlet and outlet openings 4, 5 the axis of which openings is substantially perpendicularly to the axis of said tubular valve casing 1. In the preferred embodiment shown the reduced end portions 2 and 3 are obtained by making the circumferential or side wall of said casing 1 bulged. The inlet and outlet openings 4, 5 are formed as pipe sockets having internal threads for receiving external threaded end portions of pipes (not shown).

A tube shaped member or sleeve 6 of resilient material extends through said bulged casing 1 with its end portions in sealed engagement with the reduced end portions 2, 3 of said casing 1. The sealing engagement therebetween is maintained by means of bevelled rings 7 and 8 urging said end portions of the sleeve 6 aganst smooth conical annular inner surfaces of said reduced ends 2, 3. The bevelled rings 7 and 8 are held in place by means of covers 9 and 10 secured to the casing 1 as by means of screws 11. As seen in Fig. 3 of the drawings an approximately annular passage 12 is provided between said openings 4, 5. The inner mouth of one opening 4 is formed as an annular seat 13 for the purpose described in the following.

Additionally, the covers 9 and 10 are provided with inwardly projecting hubs 14, 15 having bores therethrough in alignment with each other for receiving the end portions of a crankshaft 16 extending through the inside of said sleeve 6.

The center axis of these bores in hubs 14 and 15 intersects the axis of said inlet outlet openings 4, 5 and eccentrically with respect to the center axis of said sleeve 6 so that in normal open position the axis of the intermediate eccentric portion 16' of said crankshaft 16 coincides with the center axis of said sleeve 6. The upper end portion of the crankshaft 16 extends through the cover 9 and a handle 17 is secured to said end portion.

A cylindrical guide member 18 having a longitudinal slot 19 therein is slid onto said intermediate eccentric portion 16' of the crankshaft. Moreover, the end faces of said guide member 18 are provided with lateral notches 20, 21 cut therein perpendicularly to said slot 19. The guide member 18 is adapted to slidably fit between the opposed inner end faces of said hubs 14, 15 which have axially projecting flanges 22, 23 adapted to fit in said lateral notches 20, 21, respectively, in the guide member 18.

It is to be noted that the side surfaces of the flanges 22, 23 engaging said guide member 18 extends parallel to the axis of said inlet and outlet openings 4, 5 for a purpose which will be apparent in the following.

A ball shaped member 24 having a bore therethrough fits freely rotatably on said cylindrical guide member 18 while the rim portions of said ball shaped member 24 slidably engage the endfaces of said axially projecting flanges 22, 23 so that said ball shaped member 24 always maintains a position in register with said openings 4, 5.

Preferably the diameter of said ball shaped member 24 corresponds substantially to the inside diameter of said sleeve 6.

It is to be noted that the dimension of the various members must be such that when the crank shaft 16, by means of its handle 17, is turned 180° starting from its initial position as shown in Fig. 1 the ball shaped member 24 will press the wall of said resilient sleeve 6 against the seat 13 so that a tight closing of the opening is obtained and the flow through the passage of the valve is stopped.

In practice it has proved easy to achieve a tight closure but in case the tubular members or sleeves 6 used have various thickness it may be necessary to provide means for adjusting the distance of the axis of said crankshaft 16 with respect to said seat 13.

According to Fig. 7 showing a fragmentary sectional view of a cover 9 secured to the casing 1 such means consist of a pair of small disks 25 inserted in corresponding bores in the covers 9, 10 and eccentrically rotatably mounted in said casing 1 as by means of pins 26 integral with said disks 25. Preferably said small disks 25 and the holes receiving the same are convergent outwardly so that they will be held in place in the covers.

To adjust the position of the covers and crank shaft with respect to casing, said screws 11 are loosened and the disks 25 are turned a sufficient angle as by means of a screw driver engaging a slot in said disks 25 thereby displacing the covers a desired distance with respect to said seat 13 and then the screws 11 are retightened. It is to be noted that in this case the holes receiving the screws 11 must be large enough to permit such movements.

The operation of the valve is as follows:

In Figs. 1 to 3 inclusive the valve is assumed to take a normal open position in which the flexible sleeve 6 has a position concentric with respect to the surrounding casing 1. When the valve is to be shut off the handle 17 is turned clockwise in Fig. 4. By this movement the eccentric portion of the crankshaft 16 located in the slot 19 in said guide member 18 slides radially outwards while said notches 20, 21 provided in the end faces of said guide member 18 prevent it from rotating. As the crankshaft 16 is angularly moved by means of its handle 17 the guide member 18 and its surrounding ball shaped element 24 is caused by the guiding flanges 22, 23 to perform a substantially translatory movement towards the seat 13 as is best seen in Fig. 4. When the handle is turned 180° from its initial position, shown in Fig. 1, and the sleeve 6 is urged into tight engagement with said seat 13, further movement of the handle is limited by the inner side surface of said flanges 22, 23 engaging the end portions of the eccentric portion 16'. This is of great importantce as in practice there has been found that operators handling valves having resilient tightening means in general draw home the valve operating means as much as they can thereby rapidly destroying said tightening means owing to the fact that said resilient means are generally crushed by the excessive force thereon. According to the present invention this is not possible at all even when no stopping means are present, thereby permitting adjustment of a suitable predetermined tightening pressure which cannot be exceeded thus securing a maximum life of said resilient member.

Furthermore it is to be noted that it is not necessary to bring about a translatory movement of said ball shaped member 24 along its whole path of movement although this is most advantageous. Thus in the embodiment shown in Fig. 1 to 6 inclusive the depth of the slot 19 must not correspond to the distance A of the crankshaft 16 as shown in Fig. 4. Obviously, if said distance A of the crankshaft as shown in Fig. 4 exceeds the depth of the slot 19 in an intermediate position of the crankshaft the guide member 18 will, in an intermediate position, temporarily be moved away from said guiding surfaces on said hubs 14, 15. However, this condition will not be disadvantageous at all provided the guide member 18 and its surrounding ball shaped member 24 are caused to resume their translatory movement before the sleeve 6 touches the seat 13.

What I claim is:

1. A valve of the class described comprising a valve casing having ends and a side wall shaped to form a bulged chamber in said casing, a resilient tubular valve member extending through said valve casing and having its edges tightly secured to the ends of said casing so as to form an annular valve chamber between said valve member and said side wall, said casing wall being provided with inlet and outlet openings, a pair of members secured, respectively, to opposite ends, of said valve casing, said members having guide surfaces on their inner sides, a crank shaft rotatably mounted in said members and extending longitudinally through said resilient tubular valve member, a guide member loosely mounted on said crankshaft and co-operating with said guide surfaces on said members for effecting a translatory movement laterally with respect to the axis of said tubular valve member towards and away from one of said openings upon rotation of said crankshaft, a ball shaped operating member mounted on said guide member to force the resilient tubular valve member into and out of sealing engagement with said one opening upon said movement of said guide member, and external means for turning said crankshaft.

2. A valve as claimed in claim 1, and the further feature that said members secured at said ends of said valve casing serve to expand the outer end portions of said resilient tubular valve member into sealing engagement with the inner end portions of said valve casing.

References Cited in the file of this patent

UNITED STATES PATENTS

| | | |
|---|---|---|
| 109,730 | Hanks | Nov. 29, 1870 |
| 237,854 | Garsed | Feb. 15, 1881 |
| 393,536 | Brudin | Nov. 27, 1888 |
| 588,765 | Draulette | Aug. 24, 1897 |
| 756,491 | Gold | Apr. 5, 1904 |
| 957,347 | Kennedy | May 10, 1910 |
| 1,171,189 | Grandi | Feb. 8, 1916 |
| 2,348,083 | McCabe | May 2, 1944 |
| 2,534,577 | Courtot | Dec. 19, 1950 |

FOREIGN PATENTS

| | | |
|---|---|---|
| 623,696 | Great Britain | of 1949 |